(12) United States Patent
Levi et al.

(10) Patent No.: US 7,664,516 B2
(45) Date of Patent: Feb. 16, 2010

(54) METHOD AND SYSTEM FOR PEER-TO-PEER ADVERTISING BETWEEN MOBILE COMMUNICATION DEVICES

(75) Inventors: Andrew E. Levi, Plano, TX (US); Bradley W. Bauer, Richardson, TX (US)

(73) Assignee: Aztec Systems, Inc., Carrollton, TX (US)

( * ) Notice: Subject to any disclaimer, the term of this patent is extended or adjusted under 35 U.S.C. 154(b) by 356 days.

(21) Appl. No.: 11/318,144

(22) Filed: Dec. 23, 2005

(65) Prior Publication Data

US 2007/0016921 A1  Jan. 18, 2007

Related U.S. Application Data

(60) Provisional application No. 60/639,267, filed on Dec. 27, 2004.

(51) Int. Cl.
    *H04W 4/00* (2009.01)
(52) U.S. Cl. .................... 455/466; 705/14; 725/35; 455/414.1
(58) Field of Classification Search ............. 725/32, 725/33, 34, 35, 36; 455/258; 705/14
    See application file for complete search history.

(56) References Cited

U.S. PATENT DOCUMENTS

| 6,324,519 | B1* | 11/2001 | Eldering | 705/14 |
| 2001/0047294 | A1* | 11/2001 | Rothschild | 705/14 |
| 2002/0077988 | A1* | 6/2002 | Sasaki et al. | 705/59 |
| 2002/0094868 | A1* | 7/2002 | Tuck et al. | 463/42 |
| 2004/0148424 | A1* | 7/2004 | Berkson et al. | 709/236 |
| 2005/0044483 | A1* | 2/2005 | Maze et al. | 715/501.1 |

\* cited by examiner

*Primary Examiner*—Nick Corsaro
*Assistant Examiner*—Quan M Hua
(74) *Attorney, Agent, or Firm*—Schultz & Associates P.C.

(57) ABSTRACT

Disclosed are a method and system for peer-to-peer advertising between mobile communication devices. A subsidy program is set up based on a profile of an advertiser having at least one advertising media. A qualified subscriber is identified for the advertiser based on a profile of a subscriber. One or more advertisers and subsidy programs for the qualified subscriber is selected. In addition, when a communication transmission is received from a source communication device, at least one advertising media is associated with the communication transmission and the communication transmission is transmitted from a source communication device to a destination communication device.

29 Claims, 4 Drawing Sheets

METHOD AND SYSTEM FOR PEER-TO-PEER ADVERTISING BETWEEN MOBILE COMMUNICATION DEVICES

This application claims priority from U.S. Provisional Patent Application Ser. No. 60/639,267, filed Dec. 27, 2004, and entitled "A METHOD AND SYSTEM FOR PEER-TO-PEER ADVERTISING BETWEEN MOBILE DEVICES".

BACKGROUND

As peer-to-peer and mobile technologies evolve into highly sophisticated two-way communication systems including mobile phones, instant messaging devices, and personal digital assistants (PDA), the adoption and usage of such technologies continue to increase at a rapid rate. Advertisers are highly motivated to identify new methods of creating brand awareness to users. One of these methods is known as advertising impressions. Leveraging mobile technologies as described above, advertising impressions provide brand and product awareness by directly displaying company advertisements, offering sale promotions, or facilitating the sale of products directly to users' devices.

In addition to advertisers, users may utilize these technologies to select specific advertisers who may reach them. For example, technologies like personal digital video recorders allow users to skip undesirable advertisements. In addition, technologies, such as a subscription of satellite radio, allow users to listen to music without the disruption of commercials.

With the declining ability to offer advertisements through traditional broadcast advertising medium, such as public radio and television, a need exists for a method that offers more frequent and effective direct advertising to peer-to-peer users.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
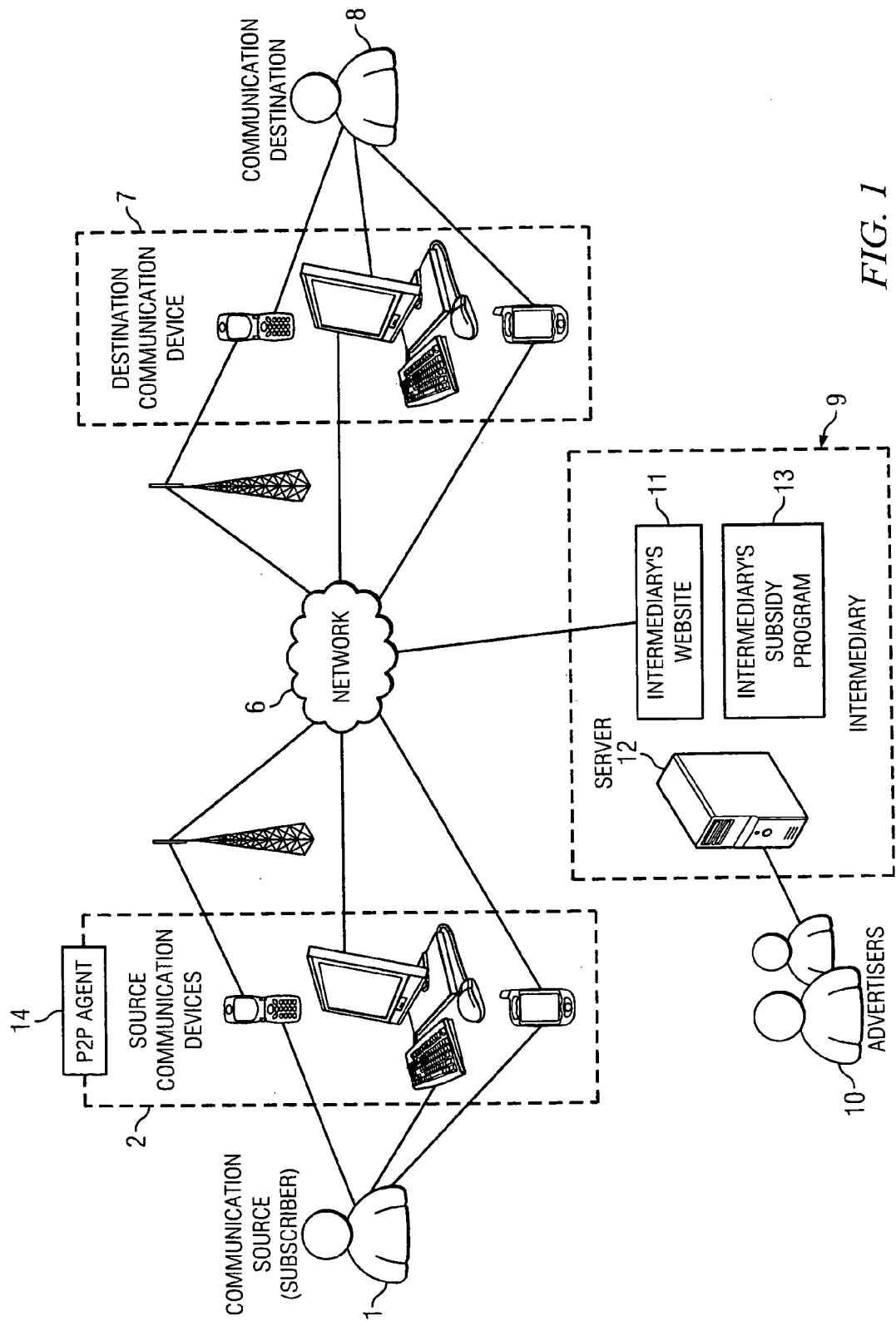
FIG. 1 is a diagram of exemplary components for providing advertising between peer-to-peer communication devices.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Aspects of the present disclosure provide effective transmissions of advertisements preceding and following transmissions of peer-to-peer communications, which occur directly between peer-to-peer communication devices. Examples of peer-to-peer communication devices include cellular phones, personal digital assistants (PDA), personal computers, instant messaging devices, and audio devices.

FIG. 1 is a diagram of exemplary components for providing direct advertising between peer-to-peer communication devices. A communication source, such as subscriber 1, subscribes to a communication subsidy program 13 of an intermediary 9. In an illustrative embodiment, the communication subsidy program 13 of the intermediary 9 is funded in whole or in part by advertisers 10. Alternatively, the communication subsidy program 13 of the intermediary 9 may be funded by an independent entity, an Internet service provider, or a telecommunications service provider. The intermediary communication subsidy program 13 may be developed using an object-oriented programming language, such as Java™ or C++, C#, or other programming languages.

When a communication transmission (a cellular phone call, a video conferencing session, an instant message, a personal computer communication, or a voice communication) is initiated by the subscriber 1 to a communication destination 8, an advertisement preceding and/or following the communication is transmitted to a destination communications device 7 used by communication destination 8. The subscriber 1 may utilize a source communication device 2, such as a cellular phone, a personal computer, a personal digital assistant, or an instant messaging device, to initiate the communication. Source communication device 2 may be coupled to a network 6 and may communicate with destination communication device 7 via the network 6 using a communications protocol. Examples of network 6 may be the Internet, a private network, a cellular phone network, or other service provider networks. Examples of the communication protocol include Transmission Control Protocol/Internet Protocol (TCP/IP), Global System for Mobile Communications (GSM), Code Division Multiple Access (CDMA), and Wireless Application Protocol (WAP).

An operating system running on communication devices 2 and 7 coordinates and provides control of various components. The operating system may be a commercially available operating system such as Microsoft® Windows® Mobile (Microsoft and Windows are trademarks of Microsoft Corporation, Seattle, Wash.). An object-oriented software system, such as the Java™ software system, may run in conjunction with the operating system and provide calls to the operating system from Java™ programs or applications executing on communication devices 2 and 7. (Java is a product available from Sun Microsystems, Inc, of Santa Clara, Calif.) It is understood that the present disclosure may be used with other operating systems and applications written using other programming languages.

When the communication transmission is received by destination communication device 7, the advertisement may be displayed, played, or confirmed. The source of the advertisement may be announced to the recipient as being endorsed by the advertisers 10, an independent entity, an Internet service provider, a telecommunication service provider, or other types of communication providers. It is understood that FIG. 1 is intended as an example, and not as an architectural limitation for different embodiments of the present disclosure.

An intermediary's website 11 may reside in a server 12 managed by intermediary 9. Advertisers 10 may create and manage its own advertisement subsidy program or choose to participate in an intermediary's separately managed communication subsidy program 13. In the event of the advertisers choosing and intermediary's communication subsidy program 13, advertisers 10 are required to complete a setup process, receive approval of their profile by the intermediary from a technical and procedural context, and upload their desired ads to be used in the intermediary's communication subsidy program 13 before advertisements may be offered.

Figure 2:
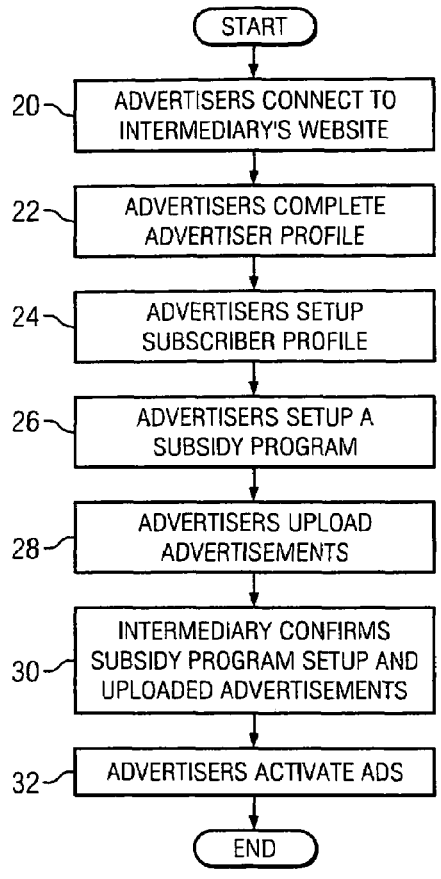
FIG. 2 a flowchart of an embodiment of an advertiser setup process.

FIG. 2 is a flowchart of an embodiment of an advertiser setup process which utilizes the exemplary components of FIG. 1. In step 20, advertisers 10 connect to or browse the intermediary's website 11. In step 22, advertisers 10 complete an advertiser profile on the intermediary's website 11 identifying the advertisers' criteria. In step 24, advertisers 10 setup a subscriber profile on the intermediary's website 11 identifying necessary demographic criteria of a desirable subscriber 1.

In step 26, advertisers 10 set up a subsidy program. The subsidy program 13 enables advertisers 10 to select or endorse desirable subscribers in order to subsidize the communication fees, offer its own product discounts or other company's product discounts, generate and accumulate "rewards points" for the subscribers, and mitigate or defer other expenses of the subscriber 1. The advertisers 10 may provide other types of subsidies or incentives to the subscribers 1 without departing the spirit and scope of the present disclosure. The selection of subscribers may be based on a matching of the subscribers' criteria against the advertisers' criteria.

In addition, the subsidy program 13 enables advertisers 10 to identify what level of discounts, credits, points, or offerings the subscriber 1 receives as a subsidy in accordance with certain performance criteria. An example of performance criteria includes the number of communication transmissions the subscriber had made and the length of the transmissions. Furthermore, the identification process may be accomplished through a bidding process, an automated auction, or may be standardized based upon other categorical groupings. An example of the bidding process includes a number of advertisers bidding for a group of premium subscribers, who communicate with other subscribers most frequently. An example of categorical groupings includes allowing the subscriber to be endorsed by a different advertiser for each communication event based on a target subsidy or a target destination.

In step 28, advertisers 10 upload their advertisements, which may be in a form of text, audio, video, static graphic, or other advertising media, to the intermediary's website 11 to be later associated with one or more subscriber's communications. Advertisers 10 also have the ability to identify when and how to apply each advertisement media type based upon a set of rules or logic defined by either the advertisers 10 themselves or the intermediary 9.

In step 30, the intermediary 9 confirms with advertisers 10 that the subsidy advertisements are ready for use and that the subsidy program setup is complete. Advertisers 10 may then elect, through a secure login process, to endorse themselves in order to test their advertisements and adjust the advertisements as necessary. Otherwise, in step 32, advertisers 10 may activate one or more advertisements for selection by the subscriber 1. Thus, the process is complete.

Figure 3:
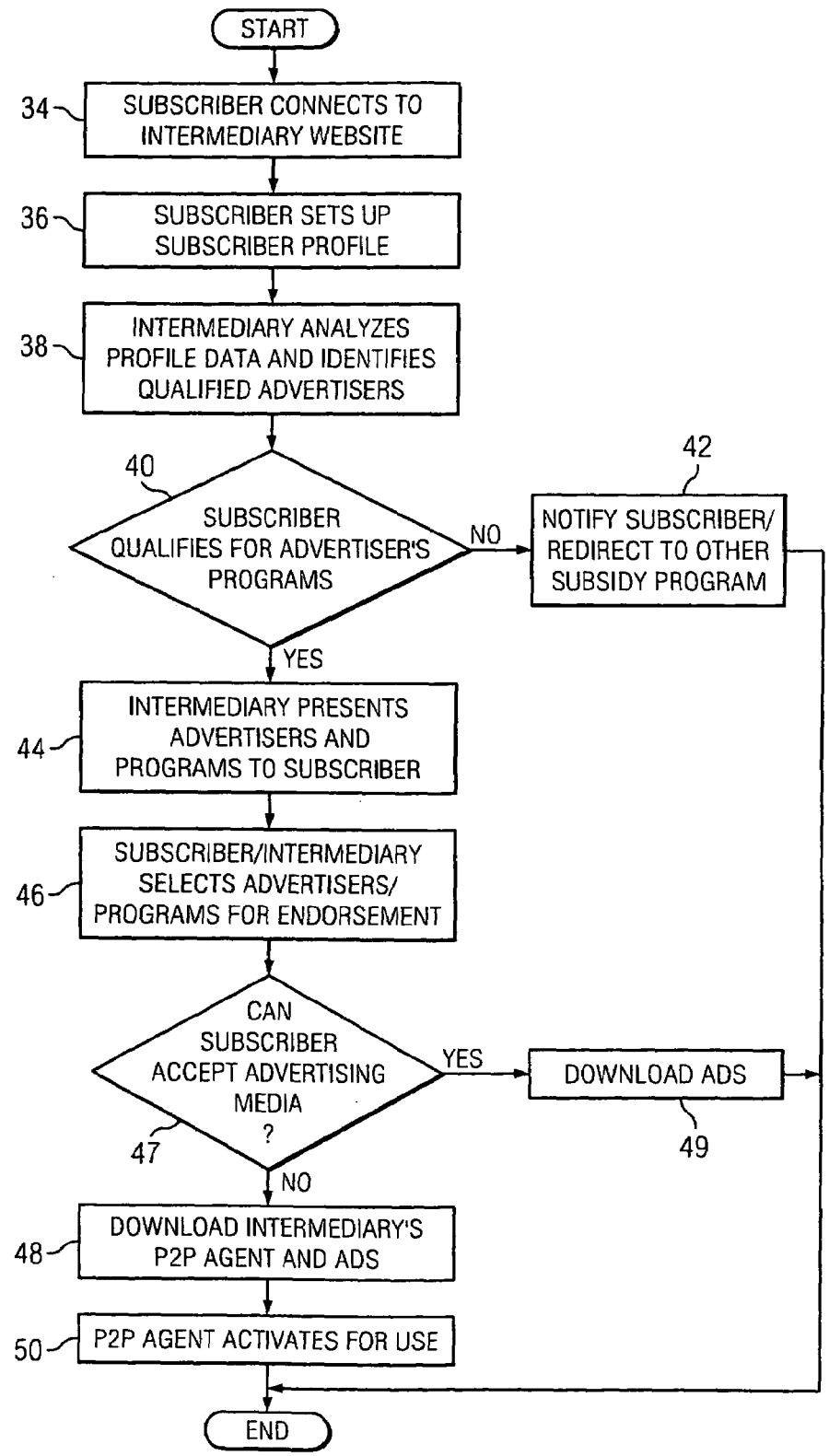
FIG. 3 is a flowchart of an embodiment of a subscriber setup process.

FIG. 3 is a flowchart of an embodiment of a subscriber setup process which utilizes the exemplary components of FIG. 1. To become a subscriber of the intermediary's communication subsidy program 13, in step 34, source communication device 2 utilized by subscriber 1 must first connect to the intermediary website 11. In step 36, subscriber 1 sets up a subscriber profile and qualifies for the subsidy program.

Alternatively, the subscriber 1 may be automatically enrolled in the subsidy program 13 as a result of a relationship with a service provider, such as a cell phone company contract, an existing service provided by an Internet service provider or by other communication service providers, or endorsers such as a product retailer who distributes branded communications devices that are limited to endorsing only their brand through approved subscribers. The subscriber profile includes information regarding the subscriber 1, for example, a name, an address, a device type, a serial number of the device, a phone number of the device, an IP Address of the device, basic demographic information of the subscriber 1, and a carrier calling program. Other characteristics of the service provider's program, such as available minutes and the subscriber's usage history, may also be collected.

Once the subscriber's profile is set up, in step 38, the intermediary 9 analyzes the profile data and identifies advertisers 10 whose criteria for subsidy match the subscriber's criteria. For example, advertiser A offers static graphic media and video media and advertiser B offers only audio media. Based on the media type offered, the intermediary 9 qualifies those subscribers whose communication devices have the capability to accept static graphics, video, and/or audio. The intermediary 9 may also require the subscriber 1 to qualify for subsidy over a trial period of time in order to quantify and qualify the calling habits of subscriber 1. For example, the intermediary 9 may examine the usage history of subscribers and qualify only those subscribers who are communicating with others most frequently.

In step 40, a determination is then made by the intermediary 9 as to whether the subscriber qualifies for an advertiser's program. In step 42, if the subscriber 1 does not qualify, the subscriber 1 is notified that the subsidy setup process may not continue, and the process terminates. Alternatively, the subscriber 1 may be redirected to another subsidy program or given information on how to qualify in the future.

In step 44, if the subscriber 1 qualifies, the intermediary 9 presents all acceptable advertisers 10 and subsidy programs available, including the criteria for continued subsidy and levels of subsidy, to the subscriber 1. In step 46, the subscriber 1 or the intermediary 9 may select one or more advertisers 10 and/or subsidy programs containing multiple advertisers or advertisements for endorsement. The subsidy program 13 may include other random or targeted advertisement that the subscriber fails to select.

In step 47, a determination is made by the intermediary 9 as to whether the subscriber 1 has the capability to accept the advertisements for endorsement. In step 49, if the subscriber has the capability to accept the advertisements, the advertisements are downloaded to the subscriber 1. In step 48, if the subscriber 1 does not have the capability to accept the advertisements, an intermediary's P2P agent 14 is downloaded to the subscriber's source communication device 2 followed by the advertiser's ads. The P2P Agent 14 manages advertisements, formats communication transmissions with the advertisements, and records advertising impression history of the advertisement transmissions periodically. In step 50, once the P2P Agent 14 and advertiser's advertisements are downloaded, the P2P agent 14 communicates securely with the intermediary's host system and activates itself for use. Thus, the process is complete.

Figure 4:
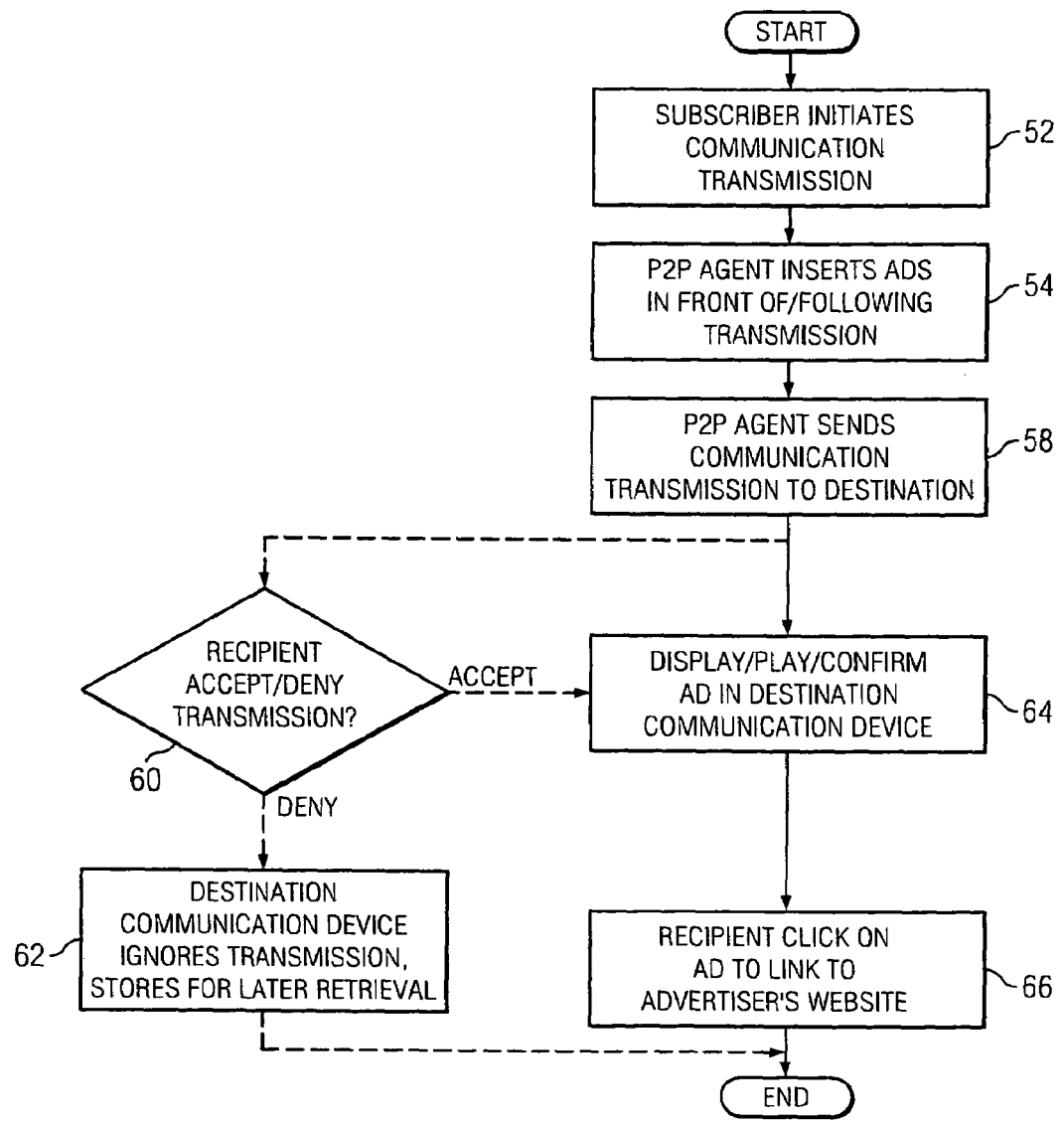
FIG. 4 is a flowchart of an embodiment of a communication Process.

FIG. 4 is a flowchart of an embodiment of a communication process. The communication process begins, in step 52, when a communication transmission is initiated by a subscriber 1. A communication transmission may include a cellular phone call, an instant message, a page, or a video conferencing session, and may be initiated using any source communication device 2. In step 54, the P2P Agent 14 formats the transmission by inserting the appropriate advertiser's advertisement preceding and/or following the transmission. During the communication session, the P2P agent 14 records the impression status based on whether the advertisement was displayed, played, or confirmed on the destination communication device 7.

In step 58, once the transmission is formatted, the P2P agent 14 sends the communication transmission to the communication destination 8. In step 66, when the communication transmission reaches the destination communication device 7, the advertisement is displayed, played, or confirmed in the destination communication device 7. In step 66, at the end of the communication session, the recipient may click on the advertisement to link, via the Internet, to the advertiser's or another designated website for additional information or further action. The link may direct the recipient to other offers, such as coupons, special offers that are unique to subscriber, or other related parties of the service. In addition to directing the recipient to other offers, advertisers 10 may transmit their own messages to the recipient any time during or after the communication process. Thus, the process is complete.

Optionally, in step 60, when the communication transmission is initially received by the destination communication device 7, a determination is made by a recipient of the destination communication device 7 as to whether to accept or deny the transmission. In step 62, if a transmission is denied, the transmission is selectively ignored, and is stored in a voice mail or similar system for later retrieval. In step 64, if the transmission is accepted or is retrieved from voice mail or other storage system, the advertisement is displayed, played, or confirmed in the destination communication device 7. The advertisement may be played, displayed or confirmed followed by, at the same time, or throughout the communication session. In step 66, at the end of the communication session, the recipient may click on the advertisement to link, via the Internet, to the advertiser's or another designated website for additional information. Thus, the process terminates.

Figure 5:
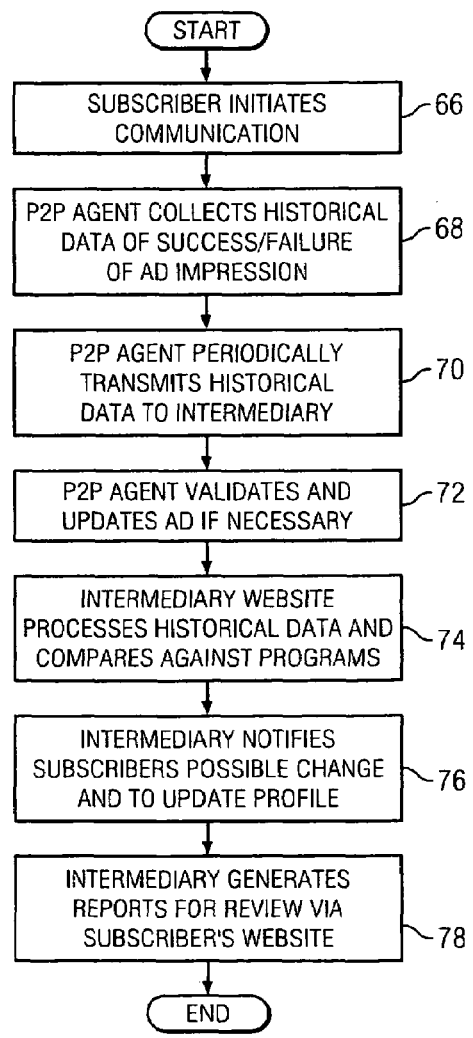
FIG. 5 is a flowchart of an embodiment of a subscription maintenance process.

FIG. 5 is a flowchart of an embodiment of a subscription maintenance process. Subscription maintenance includes collecting regular advertising impression data from the P2P Agents of the subscribers, periodic processing of the impression data against subsidy plans to facilitate distribution of subsidy amounts, changes to the subscriber's profiles, or program eligibility.

The process begins, in step 66, when a communication transmission is initiated by the subscriber 1. In step 68, the P2P agent 14 collects historical data from the subscribers, including successes and failures of advertising impression events. Examples of advertising impression events include the number of advertising impressions, the number of advertising media types that have reached and been accepted by the destination communication, the number of advertising impressions for a certain party, and the like. In step 70, the P2P agent 14 transmits this historical data to the intermediary's data warehouse for further processing. In step 72, the P2P agent automatically validates and updates current versions of advertiser's advertisements, and the P2P Agent 14 updates itself, if necessary. The intermediary 9 may also periodically update the advertisements as the P2P agent 14 is busy communicating with the intermediary's data warehouse to "check in".

In step 74, upon receipt of the historical data, the intermediary website 11 processes the received historical data and compares the data against the subsidy programs for which they have qualified in step 40 in order to generate the subsidy amount for distribution. The subsidy amount may be in a form of discounts or other incentives. In step 76, if the intermediary 9 detects that the subsidy amount of a program is likely to change, the intermediary 9 sends a message to the subscriber 1 informing the subscriber 1 of a possible change or a need to update the subscriber profile. In step 78, the intermediary 9 generates reports to advertisers, service providers, and subscribers for review via the intermediary's website 11. Based on these reports, advertisers and subscribers may readjust their profile. Thus, the process is complete.

The system and method described above enables advertisers 10 to reach targeted audiences via mobile communications devices. The recipient of a communication transmission accepts the communication session initiated by a source communication device 2, because the session is identified as being initiated by a trusted or known entity. Upon acceptance, the advertising media is played or displayed to the recipient. The subscribers are given incentives to participate in this program, such as subsidies to their communication fees and/or other compelling incentives.

Other scenarios include communication sessions in which the subscriber 1 is a recipient of the communication session initiated by a non-subscriber. In this case, the P2P agent 14 in the destination communication device 7 may insert the advertising media into the communication session prior to enabling the communication between the subscriber 1 and the non-subscriber. The advertising media is played or displayed to the subscriber 1, who is credited to receive incentives based on this communication session.

An embodiment of the present disclosure can take the form of an entirely hardware embodiment, an entirely software embodiment, or an embodiment containing both hardware and software elements. For example, one of the previously described embodiments may be implemented in software, which includes but is not limited to firmware, resident software, microcode, etc. In addition, various steps of the above processes may be performed in another order, split into additional steps, or combined into a single step. Steps may also be removed and or added to any of the above processes.

Furthermore, the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital video disc (DVD).

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. In a system comprising a network, a source communication device, a destination communication device and an intermediary connected to the network, a method for providing advertising content to a recipient associated with the destination communication device and for subsidizing a qualified subscriber associated with the source communication device comprising:
    creating a first profile including a set of demographic requirements related to at least one advertiser of a group of advertisers;
    creating a second profile including a set of demographic data related to the subscriber;
    deriving a match condition between the first profile and the second profile;
    determining if the subscriber is a qualified subscriber based on the match condition;
    conditioning a set of subsidy programs based on the match condition;
    communicating a subsidy program of the set of subsidy programs to the qualified subscriber;
    receiving a first selection of the at least one advertiser of the group of advertisers from the qualified subscriber;
    receiving a second selection of a chosen subsidy program from the set of subsidy programs from the qualified subscriber;
    providing an endorsement tag related to the at least one advertiser of the group of advertisers and linked with the advertising content;
    transmitting a content communication from the qualified subscriber to the recipient including the endorsement tag;
    subsidizing the qualified subscriber according to the chosen subsidy program;
    receiving a signal from the recipient through execution of the endorsement tag to transmit the advertising content; and,
    transmitting the advertising content to the recipient.

2. A method for providing access to an advertisement from an advertiser to a source communication device possessed by a subscriber and distributing the access to the advertisement from the source communication device to a destination communication device possessed by a recipient, wherein the destination communication device is compatible with the source communication device, and the recipient having a relationship to the subscriber, the method comprising the steps of:
    comparing a desired demographic profile to a subscriber demographic profile to derive a match;
    establishing a bi-lateral endorsement between the subscriber and the advertiser; providing a subsidy program to the subscriber based on the match;
    sending a token related to the advertisement to the source communication device;
    activating an endorsement manager in the source communication device; initiating a communication session between the source communication device and the destination communication device;
    transmitting a message, including the token, from the source communication device to the destination communication device contemporaneously with the communication session; and
    recognizing a subsidy, according to the subsidy program, for the subscriber after a termination of the communication session.

3. The method of claim 2, wherein the step of transmitting a message further comprises transmitting the token from the source communication device to the destination communication device using the endorsement manager.

4. The method of claim 2, wherein the step of comparing the desired demographic profile further comprises the step of creating the demographic profile according to a set of advertiser criteria.

5. The method of claim 2, wherein the step of recognizing a subsidy further comprises the step of relating the subsidy to a number of messages sent by the subscriber.

6. The method of claim 5, wherein the step of providing a subsidy further comprises the step of relating the subsidy to one of the group of a product discount, a reward, and a mitigation of expenses.

7. The method of claim 2, wherein the step of recognizing a subsidy includes the further step of basing the subsidy on an acknowledgment by the destination communication device of the receipt of the token.

8. The method of claim 1, comprising the further step of uploading the advertising content to the intermediary from at least one advertiser.

9. The method of claim 8, wherein the step of transmitting the content communication includes the further step of choosing the content communication from one of the group of a text media type, an audio media type, video media type, and a graphic media type.

10. The method of claim 1, wherein the step of creating the second profile is carried out by the subscriber at an intermediary website hosted by the intermediary.

11. The method of claim 1, wherein the step of recognizing a subsidy includes the further steps of:
    determining a first subsidy value related to transmitting the content communication; and, determining a second subsidy value related to the recipient interacting with the endorsement tag.

12. The method of claim 1, wherein a set of advertising criteria is specified in the first profile and a set of subscriber criteria is specified in the second profile;
    wherein the step of determining comprises the further steps of:
    comparing the advertiser criteria to the subscriber criteria;
    determining if a match exists between the advertising criteria and the subscriber criteria;
    if the match exists, then notifying the subscriber and the at least one advertiser of the match.

13. The method of claim 2, further comprising the steps of:
    transmitting the endorsement manager to the source communication device;
    installing the endorsement manager for use in the source communication device; and
    storing the token in a memory residing in the source communication device.

14. The method of claim 1, wherein the step of transmitting the content communication includes the further steps of:
    linking the endorsement tag with the advertisement; and
    transmitting the endorsement tag contemporaneously to the content communication.

15. The method of claim 13, wherein the step of transmitting the message includes the additional steps of:
    transmitting the message from the source communication device to the destination communication device using the endorsement manager; and recording a set of information related to an interaction with the token by the recipient at the destination communication device.

16. The method of claim 2, further comprising the steps of:
determining if the recipient accepts the communication session;
displaying the token if the recipient accepts the communication session;
redirecting the recipient to a website displaying the advertisement upon an interaction with the token by the recipient; and
storing a set of data, related to the interaction with the token, in a memory residing on the source communication device.

17. The method of claim 2, wherein an intermediary interacts with the advertiser, the source communication device and the destination communication device, further comprising the steps of:
storing a first set of historical data, related to an interaction with the token by the recipient, in a memory residing on the source communication device;
periodically transmitting the first set of historical data to the intermediary;
updating the advertisement; and
calculating the subsidy based on the interaction with the token.

18. The method of claim 17, further comprising the steps of:
storing a second set of historical data, related to transmitting the message, in a memory residing on the source communication device;
storing a third set of historical data, related to a viewing of the advertisement by the recipient in the memory residing at the intermediary;
periodically transmitting the second set of historical data from the source communication device to the intermediary; and,
comparing the first set of historical data, the second set of historical data, and the third set of historical data against the subsidy program to determine the subsidy.

19. The method of claim 18, further comprising:
generating a report, to the subscriber and the advertiser, related to the first set of historical data, the second set of historical data and the third set of historical data for review via an intermediary website.

20. A system for a set of advertisers to provide a set of advertising media from a first communication device to a second communication device, associated with a recipient, connected in a communication session via a network, the system providing a subsidy to a qualified subscriber associated with the first communication device, the system comprising:
an intermediary, supporting a set of subsidy programs, an analysis application, and a website, resident on a computer server, connected to the network;
at least one subsidy program, of the set of subsidy programs, being associated with at
least one advertiser of the set of advertisers, for determining the subsidy; the intermediary having a processor configured to perform the following steps:
receive a set of demographic qualifications from at least one advertiser of the set of advertisers;
communicate a set of advertiser profiles related to the set of advertisers to a potential subscriber via the first communication device,
receive a subscriber profile related to the potential subscriber from the potential subscriber;
compare the subscriber profile related to the potential subscriber to the set of demographic qualifications from the at least one advertiser of the set of advertisers to determine a qualified subscriber,
determine a bi-lateral endorsement by the qualified subscriber and the at least one advertiser; and,
transmit the set of advertising media to the first communication device; an endorsement manager, resident on the first communication device, programmed to: transmit at least one advertising media, of the set of advertising media, to the second communication device;
log a first set of data related to the communication session; and, transmit the first set of data to the analysis application;
the intermediary having a processor configured to execute the analysis application, and perform the following steps: conduct an evaluation of the first set of data; determine an amount of the subsidy according to the evaluation; and relate the subsidy to the qualified subscriber.

21. The system of claim 20 wherein: the processor, when executing the analysis application, further performs the following steps: select a subset of advertisers from the set advertisers and at least one subsidy program of the set of subsidy programs; and, download the identity of the each advertiser of the subset of advertisers and the at least one subsidy program to the first communication device.

22. The system of claim 21 wherein the processor, when executing the analysis application, further updates the set of advertising media resident on the source device.

23. The method of claim 11 including the further steps of:
measuring a frequency of communication between the source communication device and the destination communication device; and,
measuring a frequency of interaction by the recipient; and,
the step of recognizing further comprises the step of basing the subsidy program on the frequency of communication and the frequency of interaction.

24. The method of claim 2 where the step of transmitting the message includes the additional steps of:
sending a text message;
storing a set of subscriber transmission data on the source communication device; and
storing a set of recipient interaction data on the source communication device.

25. The method of claim 24 where the step of sending a text message to the destination communication device includes the additional step of sending an advertising link in the text message.

26. The system of claim 22 where the at least one advertising media of the set of advertising media is a text message.

27. The system of claim 26 where the text message includes an active link.

28. A method for providing an advertisement related to an advertiser from an intermediary machine to a source communication device possessed by a subscriber and distributing the advertisement between the source communication device and a destination communication device possessed by a contact of a set of contacts related to the subscriber, the method comprising:
providing a first communication channel between an intermediary machine and the source communication device;
qualifying the subscriber, to become a qualified subscriber, by comparing a desired demographic profile from the advertiser to a descriptive demographic profile associated with the subscriber;

establishing a bi-lateral endorsement between the qualified subscriber and the advertiser;

moving the advertisement from the intermediary machine to the source communication device over the first communication channel;

activating an endorsement manager in the source communication device;

providing a second communication channel between the source communication device and the destination communication device;

initiating a communication session from the source communication device to the destination communication device over the second communication channel;

associating the advertisement with the communication session;

transmitting the advertisement to the destination communication device;

accessing the advertisement through the destination communication device;

storing a first set of data relating to transmitting the advertisement in the source communication device;

uploading the first set of data from the source communication device to the intermediary machine over the first communication channel;

storing a second set of data relating to accessing the advertisement in the intermediary machine;

recognizing a first reward for the qualified subscriber based on the first set of data and the second set of data; and, recognizing a second award for the qualified subscriber based on a frequency of communication sessions.

29. The method of claim 2 where the step of sending a token includes the step of sending the advertisement to the source communication device for storage.

* * * * *